United States Patent
Totten et al.

(10) Patent No.: US 7,597,093 B2
(45) Date of Patent: Oct. 6, 2009

(54) HUMIDITY BASED CONTROL SYSTEM FOR AN INTERNAL COMBUSTION ENGINE

(75) Inventors: Lynn A. Totten, Haslett, MI (US); Michael Wayne Leiferman, Brighton, MI (US); Paul R. Hozak, Sterling Heights, MI (US); Jeffrey A. Sell, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 342 days.

(21) Appl. No.: 11/703,055

(22) Filed: Feb. 6, 2007

(65) Prior Publication Data

US 2008/0059049 A1     Mar. 6, 2008

Related U.S. Application Data

(60) Provisional application No. 60/842,512, filed on Sep. 5, 2006.

(51) Int. Cl.
*F02P 5/00* (2006.01)
*F02M 25/07* (2006.01)

(52) U.S. Cl. .............. 123/677; 123/406.26; 123/568.21

(58) Field of Classification Search ............ 123/406.11, 123/406.26, 406.28, 406.44, 406.45, 406.48, 123/406.55, 568.21, 568.22, 677, 678, 679; 701/108

See application file for complete search history.

(56) References Cited

U.S. PATENT DOCUMENTS

| | | | | |
|---|---|---|---|---|
| 6,062,204 A * | 5/2000 | Cullen | ................... | 123/568.22 |
| 6,575,148 B1 * | 6/2003 | Bhargava et al. | ............ | 123/564 |
| 2006/0064232 A1 * | 3/2006 | Ampunan et al. | ........... | 701/115 |
| 2007/0051344 A1 * | 3/2007 | Pallett | ........................ | 123/443 |
| 2007/0051350 A1 * | 3/2007 | Pallet et al. | ................. | 123/688 |
| 2007/0051351 A1 * | 3/2007 | Pallett et al. | ................ | 123/692 |
| 2007/0095328 A1 * | 5/2007 | Brehob | ................... | 123/406.47 |

OTHER PUBLICATIONS

SAE Technical Paper Series, SAE 2004-01-0040 "Combined Compensation Strategy for the Minimization of the Pollutant Emission of GDI Engines Under Variable Atmospheric Conditions", Mar. 8-11, 2004, 10 pages.

* cited by examiner

*Primary Examiner*—John T Kwon

(57) ABSTRACT

A humidity based control system for an internal combustion engine includes a calculation module and a calibration module. The calculation module determines a humidity of air used in a combustion process of the internal combustion engine. The control module selectively controls spark timing and exhaust dilution in the internal combustion engine based on the humidity.

20 Claims, 3 Drawing Sheets

HUMIDITY BASED CONTROL SYSTEM FOR AN INTERNAL COMBUSTION ENGINE

CROSS-REFERENCE TO RELATED APPLICATIONS

This application claims the benefit of U.S. Provisional Application No. 60/842,512, filed on Sep. 5, 2006. The disclosure of the above application is incorporated herein by reference.

FIELD

The present disclosure relates to an internal combustion engine, and more particularly to method to control spark timing and exhaust dilution to improve fuel economy and drivability.

BACKGROUND

Efficiency of an internal combustion engine may be controlled by adjusting spark timing and an exhaust dilution that is combusted by the engine. Spark timing may be defined as generating a spark at a specific time relative to a position of a piston in a combustion chamber. A preferred spark timing occurs when the engine has a maximum output power. Output power is directly proportional to pressure within a combustion chamber of the engine. To obtain optimal pressure in the combustion chamber, the spark ignites the air/fuel mixture at a time before the piston is at top dead center.

The engine system may also dilute the air/fuel mixture to improve engine efficiency. Exhaust dilution may improve engine efficiency by reducing pumping losses. When exhaust gases are introduced during an intake stroke of a combustion event, the engine induction vacuum is decreased, thereby reducing pumping power losses of the engine. An engine control system may use an exhaust gas recirculation (EGR) system to re-circulate exhaust gases back into the intake manifold. In addition, a set of cam phasers may be used to control valve timing in order to retain exhaust gases in the combustion chamber.

Optimal spark timing and dilution values of the engine are typically determined experimentally in a single set of air conditions. However, engines do not always operate in the same set conditions due to geographic location, seasonal changes, and/or other circumstances. When engine performance is not optimized, the engine system may experience reduced fuel economy and sluggish engine output.

SUMMARY

A humidity based control system for an internal combustion engine according to the present disclosure includes a calculation module and a calibration module. The calculation module determines a humidity of air used in a combustion process of the internal combustion engine. The calibration module selectively controls spark timing of the internal combustion engine based on the humidity.

In other features, the calibration module selectively controls exhaust gas recirculation in the internal combustion engine based on the humidity. When the humidity is increasing, the calibration module increases (i.e., advances) the spark timing and decreases the exhaust gas recirculation. When the humidity is decreasing, the calibration module decreases (i.e., retards) the spark timing and increases the exhaust gas recirculation. The exhaust gas recirculation is controlled with an exhaust gas recirculation valve and/or a cam phaser.

In still other features, the calculation module includes a saturated water vapor pressure module, a partial pressure module, and a humidity module. The water vapor pressure module generates a water vapor pressure signal based on an air intake temperature signal and a barometric pressure signal. The partial pressure module generates a partial pressure signal based on a relative humidity signal and the water vapor pressure signal. The humidity module calculates the humidity based on the partial pressure signal and the barometric pressure signal.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the disclosure, its application, or uses. As used herein, the term module or device refers to an application specific integrated circuit (ASIC), an electronic circuit, a processor (shared, dedicated, or group) and memory that executes one or more software or firmware programs, a combinational logic circuit, and/or other suitable components that provide the described functionality.

According to the present disclosure, a humidity based control system compensates for atmospheric conditions during engine operation. More specifically, the humidity based control system determines a humidity level based on various sensors and adjusts spark timing and dilution of an air/fuel mixture based on the humidity level.

Figure 1:
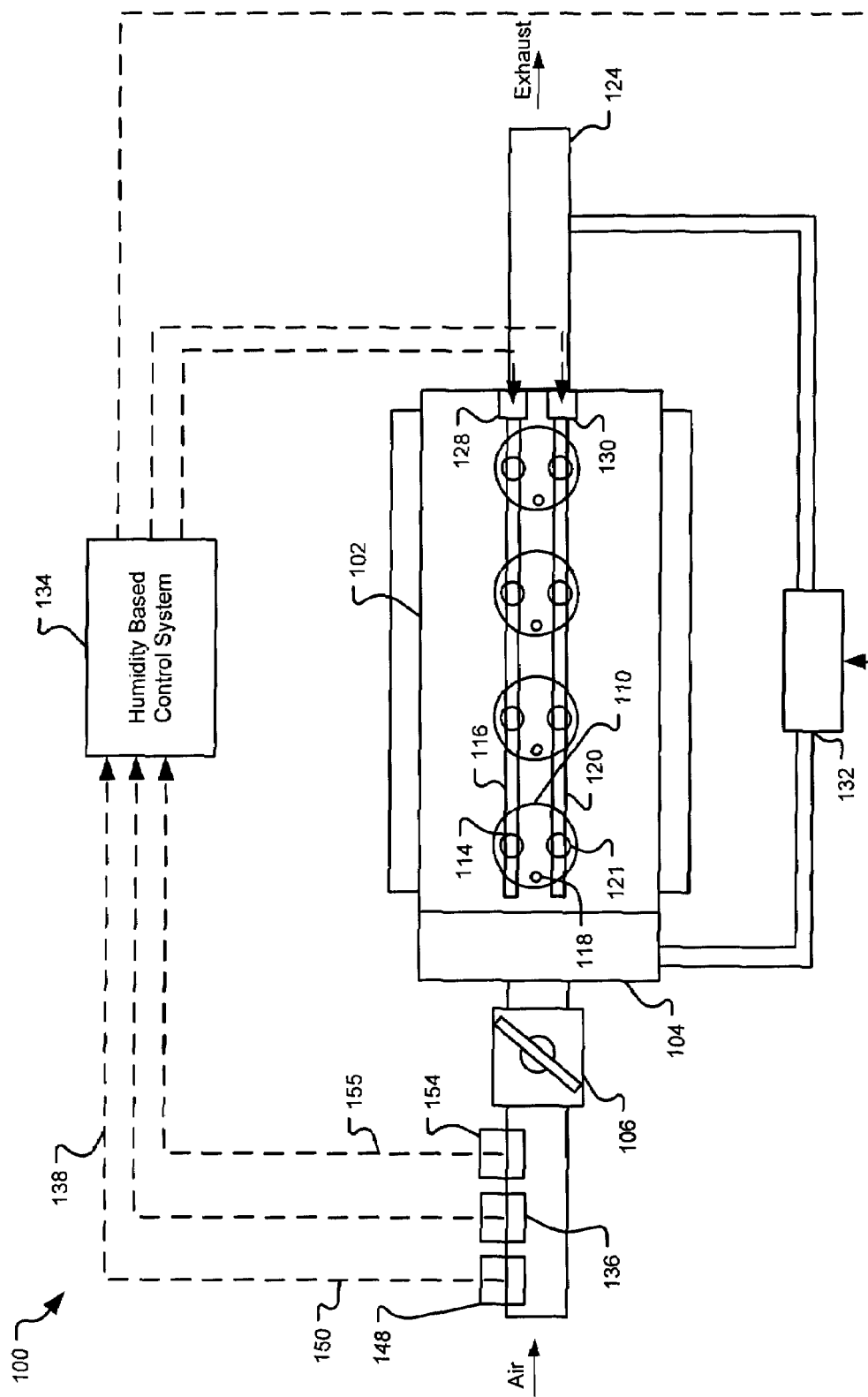
FIG. 1 is a functional block diagram of an exemplary engine system using a humidity based control system according to the present disclosure.

Referring now to FIG. 1, a functional block diagram of an engine system 100 includes an engine 102 that combusts an air/fuel mixture to produce drive torque. Air is drawn into an intake manifold 104 through a throttle 106. The throttle 106 regulates air flow into the intake manifold 104. Air within the intake manifold 104 is distributed into a cylinder 110. Although four cylinders are illustrated, it can be appreciated that the engine 102 may include additional or fewer cylinders 110. For example, engines having 2, 3, 4, 5, 6, 8, 10 and 12 cylinders are contemplated.

A fuel injector (not shown) injects fuel which is combined with air as it is drawn into the cylinder 110. A fuel injection system (not shown) provides a desired air-to-fuel ratio within each cylinder 110. An intake valve 114 selectively opens and closes to enable the air/fuel mixture to enter the cylinder 110. The intake valve position is regulated by an intake cam shaft 116. A piston (not shown) compresses the air/fuel mixture within the cylinder 110. A spark plug 118 initiates combustion of the air/fuel mixture driving the piston in the cylinder 110. The piston drives a crankshaft (not shown) to produce drive torque. The crankshaft rotatably drives camshafts 116, 120 using a timing chain (not shown) to regulate the timing of intake and exhaust valves 114,121. Although a single intake camshaft and a single exhaust camshaft are shown, it is appreciated that dual intake camshafts and dual exhaust camshafts may be used in a v-type cylinder configuration. Likewise, electro-hydrolic valve actuation, or other valve systems may be used.

Exhaust gases within the cylinder 110 are forced out of an outlet (not shown) when the exhaust valve 121 is in an open position. The exhaust valve position is regulated by the exhaust cam shaft 120. The exhaust gases are released into the atmosphere through an exhaust 124.

The engine 102 may include an intake cam phaser 128 and an exhaust cam phaser 130 that regulate rotational timing of the intake and exhaust cam shafts 116,120, respectively. More specifically, a phase angle of the intake and exhaust cam phasers 128, 130 may be retarded or advanced to control rotational timing of the input and output cam shafts 116, 120. By controlling rotational timing of the cam shafts 116,120 the amount of exhaust gases retained in the cylinder can be regulated.

The engine system 100 may include an exhaust gas recirculation (EGR) valve 132. The EGR valve 132 selectively opens and closes to regulate a flow of exhaust gases back into the intake manifold 104. Introducing exhaust gases dilutes the cylinder air/fuel mixture. This dilution lowers combustion temperatures and reduces engine emissions. When the EGR valve 132 is optimized with spark timing, fuel economy and/or performance may be improved.

An intake air temperature sensor 136 is responsive to intake air temperature and generates an intake air temperature signal 138 based thereon. A barometric pressure sensor 148 is responsive to atmospheric pressure and generates a barometric pressure signal 150 based thereon. A relative humidity sensor 154 is responsive to an amount of water that air can hold based on temperature and generates a relative humidity signal 155 based thereon. A humidity based control system 134 controls engine 102 operation based on the intake air temperature signal 138, the barometric pressure signal 150, and the relative humidity signal.

Figure 2:
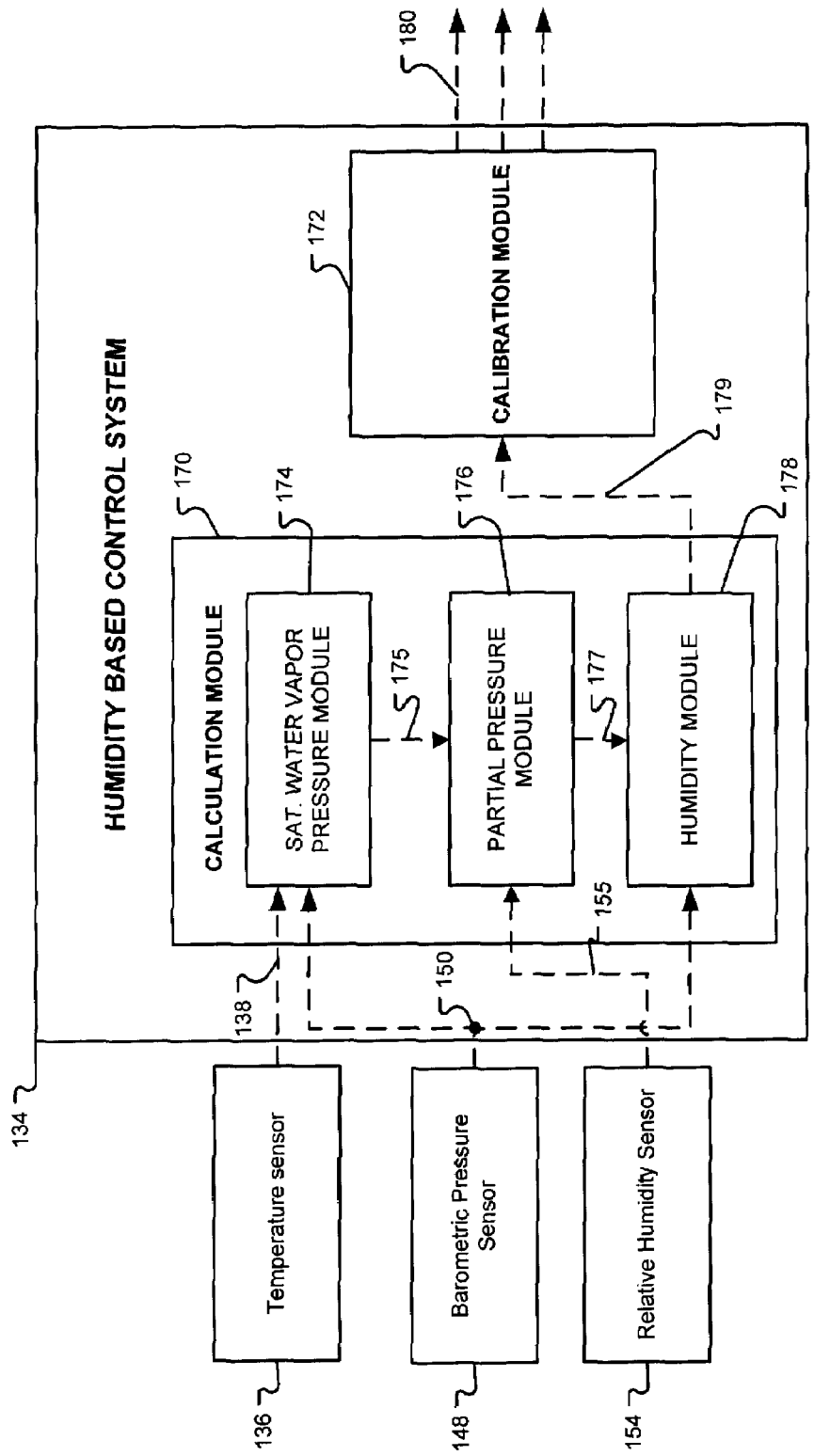
FIG. 2 is a functional block diagram of the humidity based control system according to the present disclosure.

Referring now to FIG. 2, the humidity based control system 134 includes a calculation module 170 and a calibration module 172. The calculation module 170 determines a humidity based on the intake air temperature signal 138, the barometric pressure signal 150, and the relative humidity signal 155. The calibration module 172 determines whether the humidity has increased or decreased since a previous cycle and generates a control signal to adjust spark timing and/or dilution of the air/fuel mixture.

The calculation module 170 may include a saturation water vapor pressure module 174, a partial pressure module 176, and a humidity module 178. The saturation water vapor pressure module 174 determines a saturation water vapor pressure value based on the intake air temperature signal 138 and the barometric pressure signal 150. More specifically, the saturation water vapor pressure value may be determined using the following formula:

$$es = (1.007 + 3.46 \times 10^{-6} \times p) \times (0.6064^{(17.502 \times T \div (240.97 + T))})$$

where es is the saturation water vapor pressure value, p is the barometric pressure, and T is intake air temperature. The saturation water vapor pressure module 174 generates a water vapor pressure signal 175 based on the saturation water vapor pressure value.

The partial pressure module 176 determines a partial pressure of water vapor value based on the relative humidity signal 155 and the water vapor pressure signal 175. More specifically, the partial pressure of water vapor value may be determined using the following formula:

$$e = (es \times \phi \div 100)$$

where e is the partial pressure of water vapor value, $\phi$ is relative humidity, and es is the saturation water vapor pressure value. The partial pressure module 176 generates a partial pressure signal 177 based on the partial pressure of water vapor value.

The humidity module 178 determines the humidity based on the partial pressure signal 177 and the barometric pressure signal 150. More specifically, the humidity may be determined using the following formula:

$$h = (622 \times e \div (p + e))/10$$

where h is the humidity, p is the barometric pressure, and e is the partial pressure of water vapor value. The humidity module 178 generates a humidity signal 179 based on the humidity. The calibration module 172 generates the control signal to adjust spark timing and/or dilution of the air/fuel mixture based on the humidity signal 179.

Figure 3:
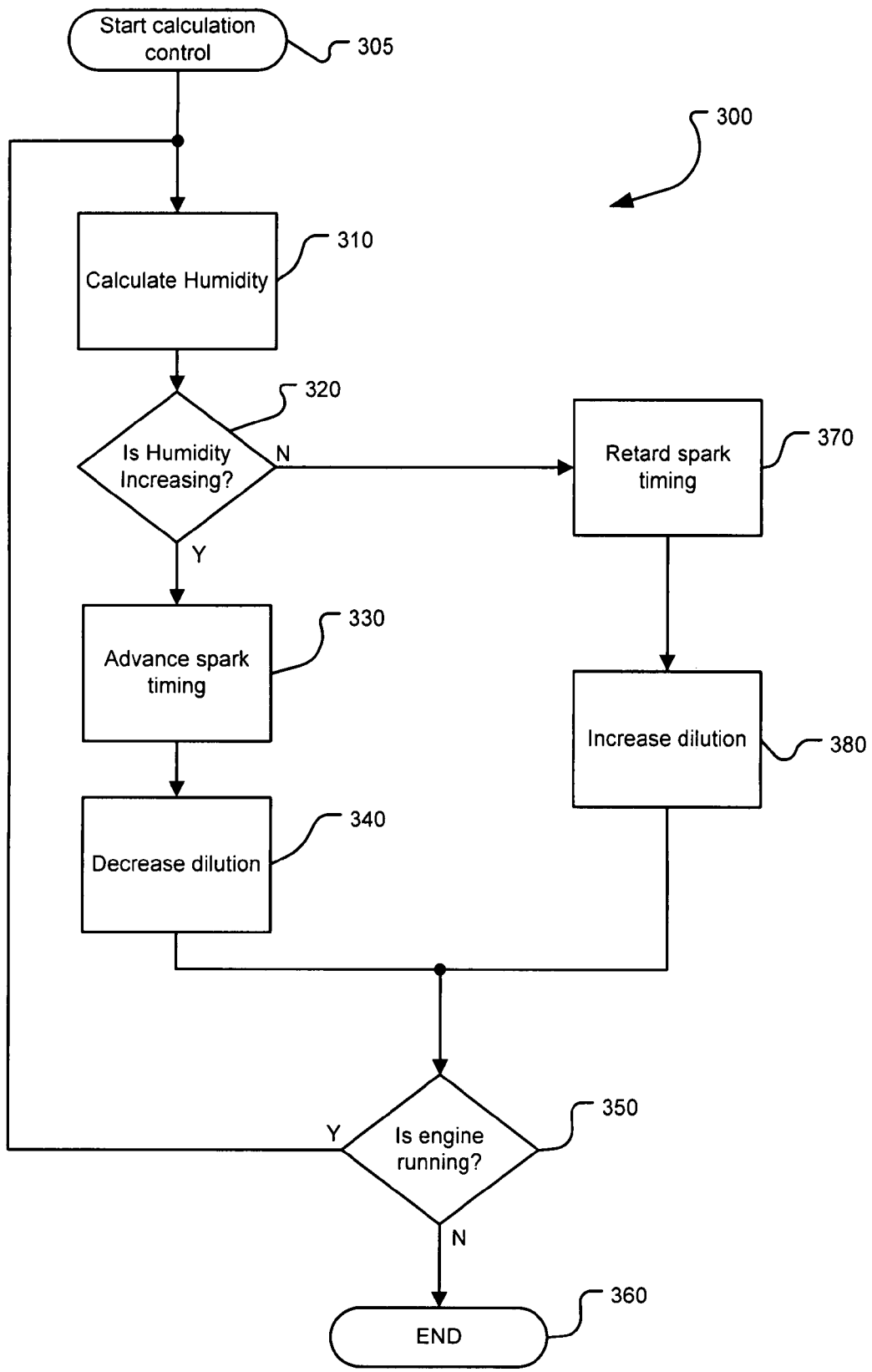
FIG. 3 is a flow chart illustrating exemplary steps taken by the humidity based control system to adjust spark timing and exhaust dilution according to the present disclosure.

Referring now to FIG. 3, exemplary steps of the humidity based control system 134 are generally identified at 300. The process begins in step 305 when the engine 102 is turned on. In step 310, the calculation module 170 determines the humidity. In step 320, the calibration module 172 determines whether the humidity is increasing or decreasing. More specifically, the calibration module 172 compares the humidity to a previous humidity calculated during the previous cycle. If the humidity is increasing, the spark timing is advanced in step 330. In step 340, the humidity based control system 134 decreases dilution of the air/fuel mixture using the EGR valve 132 and/or the cam phasers 128,130. In step 350, the humidity based control system 134 determines whether the engine 102 is running. If the engine is running, the process returns to step 310. If the engine 102 is not running, the process ends in step 360.

If the calibration module 172 determines that the humidity is decreasing in step 320, spark timing is retarded in step 370 to allow correct combustion phasing. In step 380, the humidity based control system 134 increases dilution of the air/fuel mixture using the EGR valve 132 and/or the cam phasers 128,130 and proceeds to step 350. Thus, when less moisture is in the air, more exhaust gases are introduced to dilute the air/fuel mixture.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A humidity based control system for an internal combustion engine, comprising:

a calculation module that determines a first humidity of air used in a combustion process of the internal combustion engine; and a calibration module that compares the fist humidity with a second humidity calculated during a previous cycle and that selectively controls spark timing of the internal combustion engine based on a comparison between said first humidity and said second humidity.

2. The humidity based control system of claim 1 wherein said calibration module selectively controls exhaust gas recirculation in the internal combustion engine based on said comparison.

3. The humidity based control system of claim 2 wherein said calibration module increases said spark timing when said first humidity is greater than said second humidity.

4. The humidity based control system of claim 3 wherein said calibration module decreases said exhaust gas recirculation when said first humidity is greater than said second humidity.

5. The humidity based control system of claim 2 wherein said calibration module decreases said spark timing when said first humidity is less than said second humidity.

6. The humidity based control system of claim 5 wherein said calibration module increases said exhaust gas recirculation when said first humidity is less than said second humidity.

7. The humidity based control system of claim 2 wherein said exhaust gas recirculation is controlled with an exhaust gas recirculation valve.

8. The humidity based control system of claim 2 wherein said exhaust gas recirculation is controlled with a cam phaser.

9. The humidity based control system of claim 1 wherein said humidity is based on an air intake temperature signal, a barometric pressure signal, and a relative humidity signal.

10. The humidity based control system of claim 9 wherein said calculation module comprises:
a saturated water vapor pressure module that generates a saturated water vapor pressure signal based on said air intake temperature signal and said barometric pressure signal;
a partial pressure module that generates a partial pressure of water vapor signal based on said relative humidity signal and said saturated water vapor pressure signal; and
a humidity module that calculates said humidity based on said partial pressure signal and said barometric pressure signal.

11. A method to calibrate an internal combustion engine, comprising:
determining a first humidity of air used in a combustion process of the internal combustion engine;
comparing said first humidity with a second humidity calculated during a previous cycle; and
selectively controlling spark timing of said internal combustion engine based on a comparison between said first humidity and said second humidity.

12. The method of claim 11 further comprising selectively controlling exhaust gas recirculation in the internal combustion engine based on said comparison.

13. The method of claim 12 further comprising increasing said spark timing when said first humidity is greater than said second humidity.

14. The method of claim 13 further comprising decreasing said exhaust gas recirculation when said first humidity is greater than said second humidity.

15. The method of claim 12 further comprising decreasing said spark timing when said first humidity is less than said second humidity.

16. The method of claim 15 further comprising increasing said exhaust gas recirculation when said first humidity is less than said second humidity.

17. The method of claim 12 wherein said exhaust gas recirculation is controlled with an exhaust gas recirculation valve.

18. The method of claim 12 wherein said exhaust gas recirculation is controlled with a cam phaser.

19. The method of claim 11 wherein said humidity is based on an air intake temperature, a barometric pressure, and a relative humidity.

20. The method of claim 19 further comprising:
determining a saturated water vapor pressure based on said air intake temperature and said barometric pressure;
determining a partial pressure of water vapor based on said relative humidity and said saturated water vapor pressure; and
determining said humidity based on said partial pressure of water vapor and said barometric pressure.

* * * * *